Feb. 28, 1950  C. PARKER  2,499,254
THERMOS LUNCH BOX
Filed Oct. 1, 1947
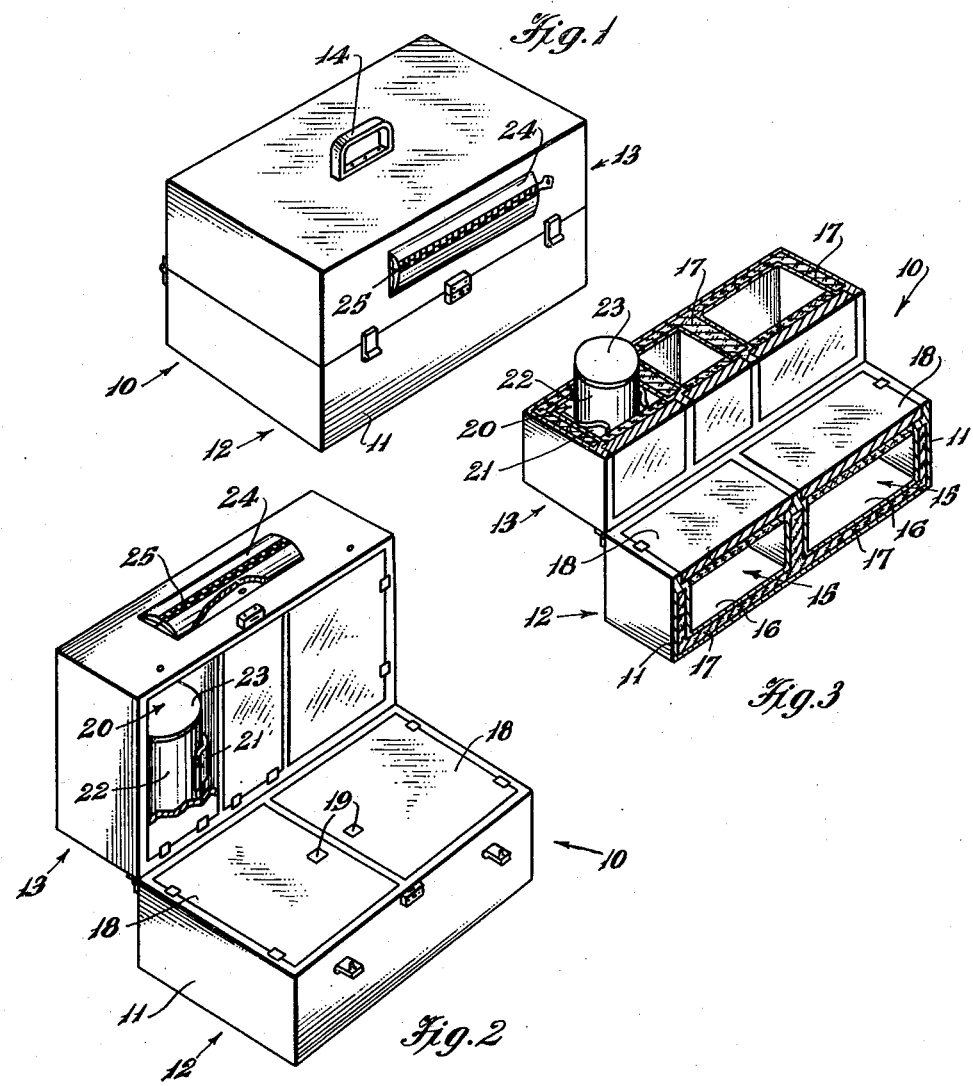
INVENTOR.
CLYDE PARKER,
BY J. Ledermann
ATTORNEY Patented Feb. 28, 1950

2,499,254

UNITED STATES PATENT OFFICE 2,499,254

THERMOS LUNCH BOX

Clyde Parker, Kannapolis, N. C.

Application October 1, 1947, Serial No. 777,257

1 Claim. (Cl. 206—4)

This invention relates to lunch boxes, and aims to provide a lunch box having heat-insulated compartments, in which food can be kept at any desired temperature until the lunch box is opened, thus affording a more appetizing meal for a person, since hot meals and drinks can be prepared and kept hot for indefinite periods in the lunch box embodying this invention. Similarly, cold drinks and desserts can be maintained at cold temperatures.

Another object of the invention is the provision of such a lunch box having a container mounted thereon for the purpose of carrying small utensils, such as knives, forks, or the like, therein.

The above as well as additional and more detailed objects will become apparent in the following description, wherein characters of reference refer to like-numbered parts in the accompanying drawing. It is to be noted that the drawing is intended for the purpose of illustration only, and that it is neither desired nor intended to limit the invention to any or all of the specific details of construction shown, excepting insofar as they may be deemed essential to the invention.

Referring briefly to the drawing,

Fig. 1 is a perspective view of a lunch box embodying this invention, in closed condition.

Fig. 2 is a perspective view of the lunch box of Fig. 1 in opened condition with one of the compartment doors broken away.

Fig. 3 is a sectional view taken on the line 3—3 of Fig. 1 with the box in opened condition.

Referring in detail to the drawing, the numeral 10 indicates a substantially rectangular box having outer walls 11 of metal or other suitable material, comprising a bottom section 12 and an upper or cover section 13 hinged to the bottom and having a handle 14 thereon.

The bottom section 12 is divided into several food containing compartments 15, of which two are illustrated, having linings or inner walls 16 spaced from the outer wall 11. An insulating layer 17 of any suitable material such as, for instance, cork, is provided, filling the space between the inner walls 16 and the outer wall 11.

Hinged doors or covers 18 constructed similarly to the walls, that is, having an insulating layer between inner and outer panels, are provided to cover the food compartments 15, and are secured by the latches 19.

The upper or cover section 13 of the box is divided into a plurality of compartments similar to compartments 15. One or more of the compartments of the cover section may be adapted to contain liquid foods. Such a compartment 20, Figs. 2 and 3, is provided with a pair of spring clips 21 adapted to releasably clamp a cup 22 or other container. For use in the lunch box of this invention, a cup 22 having a tight-fitting cover 23 is provided.

In use, the user places the food in the compartments at any desired temperature, then closes and latches the doors thereto. The heat-insulated walls of the compartments tend to keep the food at the temperature at which it was placed in the box. Hot food will remain hot and cold food will remain cold until the user opens the box at meal time. The cups are filled with hot or cold liquids, the covers secured thereon, and each cup placed in its compartment, the cups registering frictionally between the spring clips 21 provided therefor. Thus, a heat-insulated lunch box has been provided which will keep food at a predetermined temperature from the time that it is packed in the box until it is removed therefrom.

Obviously, modifications in form and structure may be made without departing from the spirit and scope of the invention.

A container having a slide fastener closure 25 is secured to the cover 13 and is provided for stowing silverware, such as knives, forks, or the like.

I claim:

A lunch box comprising a body portion and a cover portion hinged to said body portion, said body and cover portions having substantially the same depth, transverse partitions in said portions dividing the same into compartments, the walls of said portions and of said partitions having heat insulating means therein, one of said compartments having opposed spring clips secured to opposite walls thereof and adapted to hold a container, said compartments having covers hinged thereto and provided with latches for keeping the same closed, the front wall of said cover portion of the box having an elongated container on the outer surface thereof, said elongated container having a longitudinal opening through the front wall thereof and having a slide fastener closure means for opening or closing said opening.

CLYDE PARKER.

REFERENCES CITED

The following references are of record in the file of this patent:

UNITED STATES PATENTS

| Number | Name | Date |
|---|---|---|
| 342,365 | Kirby | May 25, 1886 |
| 1,730,403 | Boland | Oct. 8, 1929 |
| 1,896,393 | Devine | Feb. 7, 1933 |
| 2,339,580 | Park | Jan. 18, 1944 |
| 2,425,963 | Silva | Aug. 19, 1947 |